(12) United States Patent
Kupratis

(10) Patent No.: US 9,140,188 B2
(45) Date of Patent: *Sep. 22, 2015

(54) GAS TURBINE ENGINE WITH INTERCOOLING TURBINE SECTION

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 922 days.

This patent is subject to a terminal disclaimer.

(21) Appl. No.: 13/287,105

(22) Filed: Nov. 1, 2011

(65) Prior Publication Data

US 2013/0098050 A1     Apr. 25, 2013

Related U.S. Application Data

(60) Provisional application No. 61/551,107, filed on Oct. 25, 2011.

(51) Int. Cl.
| | |
|---|---|
| *F02C 7/143* | (2006.01) |
| *F02C 9/20* | (2006.01) |
| *F02C 9/22* | (2006.01) |
| *F02K 3/075* | (2006.01) |

(52) U.S. Cl.
CPC . *F02C 7/143* (2013.01); *F02C 9/20* (2013.01); *F02C 9/22* (2013.01); *F02K 3/075* (2013.01); *Y02T 50/675* (2013.01)

(58) Field of Classification Search
CPC .............. F02C 7/143; F02C 9/20; F02C 9/22; F02C 9/54; F02K 3/075

USPC .......... 60/39.23, 226.1, 226.3, 262, 728, 774, 60/792, 805

See application file for complete search history.

(56) References Cited

U.S. PATENT DOCUMENTS

| | | | | |
|---|---|---|---|---|
| 4,175,384 | A | * | 11/1979 | Wagenknecht et al. ...... 60/226.3 |
| 5,125,597 | A | * | 6/1992 | Coffinberry ............... 244/118.5 |
| 5,832,714 | A | | 11/1998 | Hines |

(Continued)

OTHER PUBLICATIONS

NEWAC Technoloogies, Highly Innovative Technologies for Future Aero Engines, Mar. 2011.

*Primary Examiner* — William H Rodriguez
*Assistant Examiner* — Arun Goyal
(74) *Attorney, Agent, or Firm* — Carlson, Gaskey & Olds, P.C.

(57) ABSTRACT

A gas turbine engine according to an exemplary aspect of the present disclosure includes, among other things, a combustor section, a low spool including a fan section and an intercooling turbine section along an engine axis aft of the fan section and forward of a combustor section. The fan section and the intercooling turbine section are coaxial with the low spool. A high spool along the engine axis includes a high pressure compressor section and a high pressure turbine section, the high pressure compressor section is aft of the intercooling turbine section and forward of the combustor section, and the high pressure turbine section is aft of the combustor section. The high pressure compressor section and the high pressure turbine section are coaxial with the high spool. A method of operating a gas turbine engine is also disclosed.

20 Claims, 3 Drawing Sheets

(56) References Cited

U.S. PATENT DOCUMENTS

| | | |
|---|---|---|
| 6,050,080 A | 4/2000 | Horner |
| 6,935,119 B2 | 8/2005 | Placko et al. |
| 6,935,831 B2 | 8/2005 | Joshi |
| 7,685,827 B2 | 3/2010 | Reale et al. |
| 7,690,202 B2 | 4/2010 | Badeer et al. |
| 2009/0145102 A1 | 6/2009 | Roberge et al. |
| 2010/0105516 A1* | 4/2010 | Sheridan et al. .............. 475/346 |
| 2011/0056208 A1 | 3/2011 | Norris et al. |

* cited by examiner

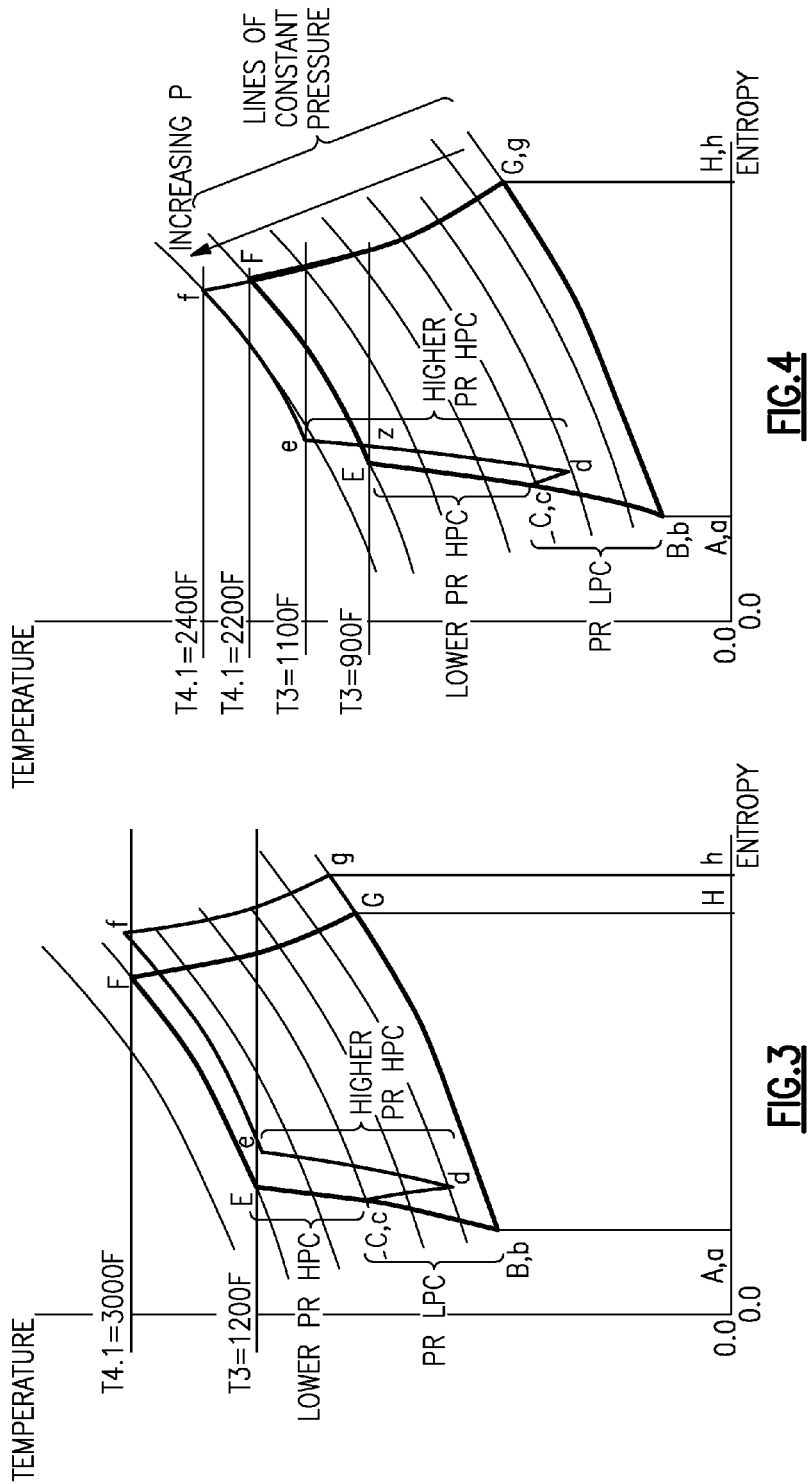

GAS TURBINE ENGINE WITH INTERCOOLING TURBINE SECTION

REFERENCE TO RELATED APPLICATIONS

The present disclosure claims priority to U.S. Provisional Patent Application No. 61/551,107, filed Oct. 25, 2011.

BACKGROUND

The present disclosure relates to gas turbine engines, and more particularly to a variable cycle gas turbine engine.

Variable cycle engines power high performance aircraft over a range of operating conditions yet achieve countervailing objectives such as high specific thrust and low fuel consumption. The variable cycle engine essentially alters a bypass ratio during flight to match requirements. This facilitates efficient performance over a broad range of altitudes and flight conditions to generate high thrust when needed for high energy maneuvers yet also optimize fuel efficiency for cruise and loiter conditions.

SUMMARY

A gas turbine engine according to an exemplary aspect of the present disclosure includes a low spool along an engine axis with a fan section and an intercooling turbine section forward of a combustor section. A high spool along the engine axis with a high pressure compressor section and a high pressure turbine section, the high pressure compressor section aft of the intercooling turbine section and forward of the combustor section, the high pressure turbine section aft of the combustor section.

A gas turbine engine according to an exemplary aspect of the present disclosure includes a low spool along an engine axis with a fan section and an intercooling turbine section forward of said combustor section. A high spool along the engine axis with an intercooling turbine section, a high pressure compressor section and a high pressure turbine section, the intercooling turbine section and the high pressure compressor section forward of the combustor section and the high pressure turbine section aft of the combustor section.

A method of operating a gas turbine engine according to an exemplary aspect of the present disclosure includes modulating a guide vane of an intercooling turbine section forward of a high pressure compressor section to reduce the intercooling turbine expansion pressure ratio (ICT PR) during a first flight condition; and modulating the guide vane of the intercooling turbine section to increase the intercooling turbine expansion pressure ratio (ICT PR) during a second flight condition.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3 is a temperature-versus-entropy diagram for a high/hot day take off condition with example temperature distributions; and FIG. 4 is a temperature-versus-entropy diagram for a cruise condition with example temperature distributions.

DETAILED DESCRIPTION

Figure 1:
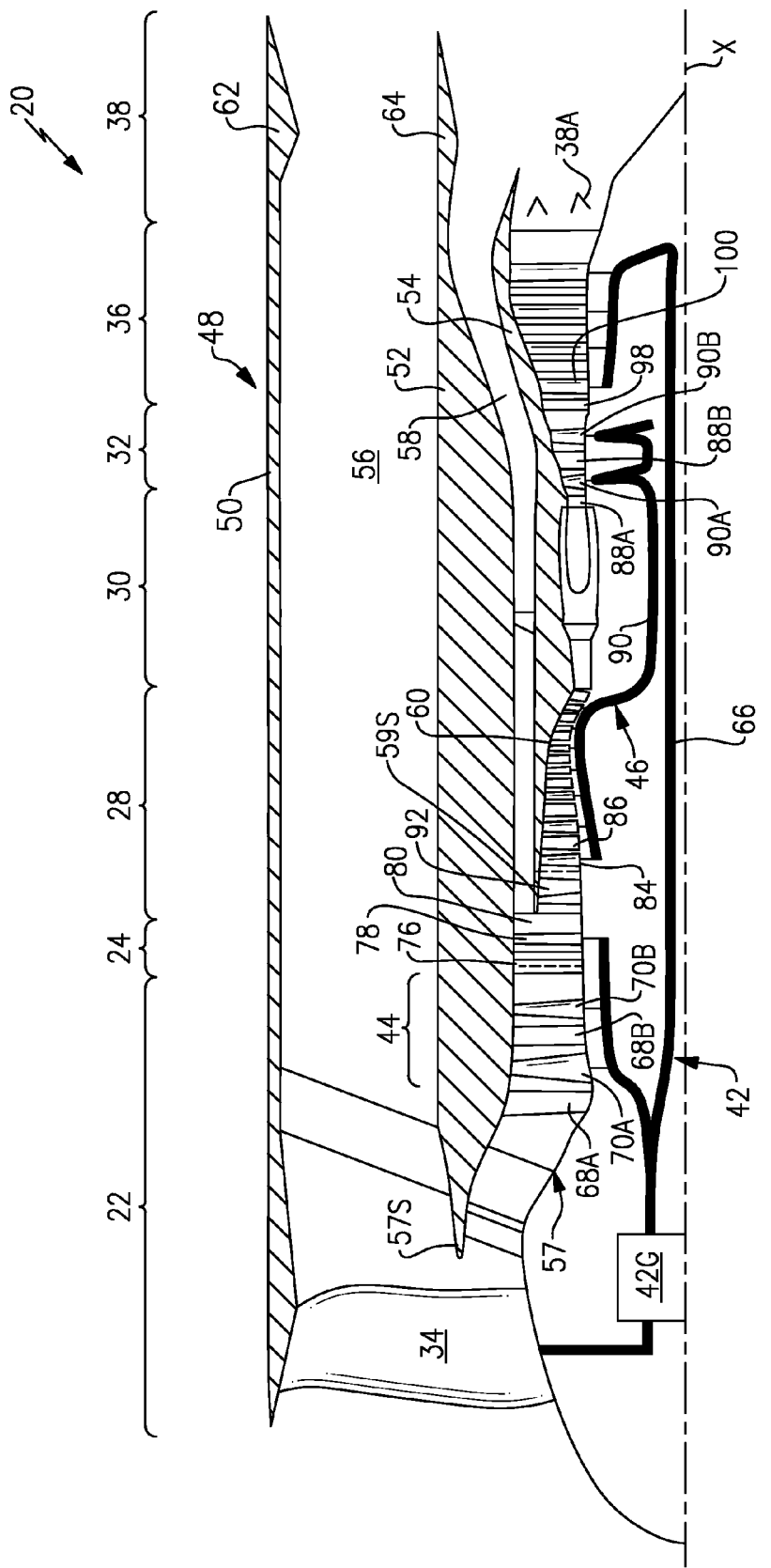
FIG. 1 is a general schematic view of an exemplary variable cycle gas turbine engine according to one non-limiting embodiment.

FIG. 1 schematically illustrates a gas turbine engine 20. The gas turbine engine 20 is disclosed herein as a variable cycle two-spool bypass turbofan that generally includes a fan section 22, an intercooling turbine section (ICT) 24, a high pressure compressor section (HPC) 28, a combustor section 30, a high pressure turbine section (HPT) 32, a low pressure turbine section (LPT) 36, and a nozzle section 38. Additional sections may include an augmentor section 38A, various duct sections, and among other systems or features such as a geared architecture 42G, which may be located in various other engine sections than that shown such as, for example, aft of the LPT. The sections are defined along a central longitudinal engine axis X.

The engine 20 generally includes a low spool 42 and a high spool 46 which rotate about the engine central longitudinal axis X relative to an engine case structure 48. It should be appreciated that other architectures, such as a three-spool architecture, will also benefit herefrom.

The engine case structure 48 generally includes an outer case structure 50, an intermediate case structure 52 and an inner case structure 54. It should be understood that various structures individually or collectively within the engine may define the case structures 50, 52, 54 to essentially define an exoskeleton that supports the spools 42, 46 for rotation therein.

The fan section 22 generally includes a bypass fan 34 and a low pressure compressor (LPC) 44. The low spool 42 drives the bypass fan 34 directly or through a geared architecture 42G to drive the bypass fan 34 at a lower speed than the low spool 42. The bypass fan 34 communicates fan flow into a bypass flow path 56, a second stream bypass flow path 58, and a core flow path 60.

The low pressure compressor 44 in the disclosed non-limiting embodiment includes two stages downstream of the bypass fan 34. It should be appreciated that various fan stages, as well as a low pressure compressor section, may alternatively or additionally be provided. The low pressure compressor 44 is within an intermediate flow path 57 upstream of a split 59S between the second stream bypass flow path 58 and the core flow path 60 but downstream of a split 57S between the bypass flow path 56 and the intermediate flow path 57 such that all airflow from the low pressure compressor 44 is expanded through the ICT 24. The ICT 24 facilitates the expansion of the airflow to a lower temperature than at the exit of the low pressure compressor 44 and therefore the inlet temperature to the HPC 28 is reduced.

The ICT 24 communicates fan flow into the second stream bypass flow path 58 and the core flow path 60. The ICT 24 is downstream of the low pressure compressor 44 such that all flow from the ICT 24 is selectively communicated into the second stream bypass flow path 58 and the core flow path 60. That is, the ICT 24 is upstream of the split 59S between the second stream bypass flow path 58 and the core flow path 60 but downstream of the split 57S between the bypass flow path 56 and the intermediate flow path 57.

The HPC 28, the combustor section 30, the HPT 32, and the LPT 36 are in the core flow path 60. These sections are referred to herein as the engine core. The core airflow is compressed by the fan section 22, expanded limitedly by the ICT 24, compressed monotonically by the HPC 28, mixed and burned with fuel in the combustor section 30, then expanded over the HPT 32 and the LPT 36. The turbines 32, 36 rotationally drive the respective high spool 46 and low spool 42 in response to the expansion. The limited expansion of the core flow by the ICT 24 rotationally drives the low spool 42 as a supplement to the LPT 36.

The second stream bypass flowpath 58 permits the match of the ICT 24 exit flow to the flow demand into the HPC 28. That is, the ICT 24 expands fan section 22 flow to reduce inlet temperatures to the HPC 28.

The bypass flow path 56 is generally defined by the outer case structure 50 and the intermediate case structure 52. The second stream bypass flowpath 58 is generally defined by the intermediate case structure 52 and the inner case structure 54. The core flow path 60 is generally defined by the inner case structure 54. The second stream bypass flow path 58 is defined radially inward of the bypass flow path 56 and the core flow path 60 is radially inward of the bypass flowpath 58.

The nozzle section 38 may include a bypass flow exhaust nozzle 62 (illustrated schematically) which receives flow from bypass flow path 56 and a mixed flow exhaust nozzle 64 which receives a mixed flow from the second stream bypass flowpath 58 and the core flow path 60. It should be understood that various fixed, variable, convergent/divergent, two-dimensional and three-dimensional nozzle systems may be utilized herewith.

The low pressure compressor 44, the ICT 24, and the LPT 36 are coupled by a low shaft 66 (illustrated schematically) which is also coupled to the bypass fan 34 directly or through the geared architecture 42G. In the disclosed non-limiting embodiment, the low pressure compressor 44 includes a first stage guide vane 68A, a first stage fan rotor 70A, a second stage guide vane 68B and a second stage fan rotor 70B. It should be appreciated that various systems may be utilized to activate the variable inlet guide vanes and variable stators. It should also be understood that other single or multistage architectures may alternatively or additionally be provided such as various combinations of a fixed or variable vanes.

The HPC 28 and the HPT 32 are coupled by a high shaft 90 (illustrated schematically) to define the high spool 46. In the disclosed non-limiting embodiment, the HPC 28 upstream of the combustor section 30 includes a multiple of stages each with a rotor 84 and vane 86. It should be understood that the HPC 28 may alternatively or additionally include other compressor section architectures which, for example, include additional or fewer stages each with or without various combinations of variable or fixed guide vanes. It should also be understood that each of the turbine sections 32, 36 may alternatively or additionally include other turbine architectures which, for example, include additional or fewer stages each with or without various combinations of variable or fixed guide vanes.

The HPT 32 in the disclosed non-limiting embodiment, includes a multiple of stages (two shown) with first stage variable high pressure turbine guide vanes 88A, a first stage high pressure turbine rotor 90A, second stage variable high pressure turbine guide vanes 88B and a second stage high pressure turbine rotor 90B. It is desirable to have variable turbine vanes both in the ICT 24 and the HPT 32 to facilitate an optimum cycle efficiency; however, significant improvement to the thermodynamic cycle is achieved by the presence of the ICT 24 alone even if the HPT 32 is not variable.

The LPT 36 in the disclosed non-limiting embodiment, includes a multiple of stages (four shown), each stage with variable low pressure turbine inlet guide vanes 98 upstream of a respective low pressure turbine rotor 100. It is desirable to have variable turbine vanes both in the ICT 24 and the LPT 36 to facilitate an optimum cycle efficiency; however, significant improvement to the thermodynamic cycle is achieved by the presence of the ICT 24 alone even if the LPT 36 is not variable. The LPT 36 is the last turbine section within the core flow path 60 and thereby communicates with the mixed flow exhaust nozzle 64 which receives a mixed flow from the second stream bypass duct 58 and the core flow path 60. The augmentor section 38A among other systems or features may be located downstream of the LPT 36.

The ICT 24 is coupled to the low shaft 66 and is driven with the low spool 42. In the disclosed non-limiting embodiment, the ICT 24 includes upstream intercooling turbine variable vanes 76, an intercooling turbine rotor 78 and downstream intercooling turbine variable vanes 80. The downstream intercooling turbine variable vanes 80 is immediately upstream of the split 59S between the second stream bypass flow path 58 and the core flow path 60. It should be appreciated that the intercooling turbine rotor 78 is a cold turbine located forward of the combustor section 30 but includes turbine blades similar in shape to the turbine blades within the HPT 32 and the LPT 36.

In the disclosed non-limiting embodiment, inlet guide vanes (IGVs) 92 immediately downstream of the intercooling turbine variable vanes 80 are within the core flow path 60 downstream of the split 59S. At cruise, the IGVs 92 are closed, and at takeoff, the IGVs 92 are opened. These IGV settings are similar in function to the downstream intercooling turbine variable vanes 80 such that the downstream intercooling turbine variable vanes 80 may be eliminated in one alternative non-limiting embodiment to simplify the engine architecture.

The high spool 46 is independent of the low spool 42. The HPC 28, the combustor section 30 and the HPT 32 set the core flow and the HPT 32 is the choke point that the HPC 28 feeds. The speed and power output of the HPT 32 determines the flow pumping rate and the pressure rise of the HPC 28 for a given combustor exit temperature that affects the status of the choke point.

The HPC 28 demands a certain inlet flow based on combustor exit temperature. There is a balance between the pressure at the exit of the HPC 28 and the temperature at the choke point. Higher combustor section exit temperature enables higher pressure at the exit of the HPC 28 and a simultaneous solution of continuity (flowrate) and power from the HPT 32.

The low pressure compressor (LPC) 44 communicates the flow required by the HPC 28 but this may result in a flow that stalls the LPC 44. The flow which exits the ICT 24 is thereby split between the HPC 28 and the second stream bypass flowpath 58 around the HPC 28 to facilitate the ability of the LPC 44 to provide a matched flow to the HPC 28 that is not a stalled condition. That is, the flow which exits the ICT 24 is selectively split into the second stream bypass flowpath 58 to provide a matched flow into the HPC 28.

Opening the upstream intercooling turbine variable vanes 76 and closing the downstream intercooling turbine variable vanes 80 for cruise reduces the intercooling turbine section pressure ratio (ICT PR) and hence reduces the intercooling effect, e.g., the inlet temperature to the HPC 28 will not be significantly decreased. Closing the upstream intercooling turbine variable vanes 76 and opening the downstream intercooling turbine variable vanes 80 for takeoff will increase ICT PR and hence increase the intercooling effect, e.g., the inlet temperature to the HPC 28 will be more significantly decreased. In the disclosed non-limiting embodiment, the intercooling turbine variable vanes 76, 80 are modulated between a 5%-25% closed position. That is, the intercooling turbine variable vanes 76, 80 are never completely closed.

Generally, the intercooling variable vanes 80 are opened for takeoff to increase the pressure ratio and intercooling effect to reduce combustor inlet temperature (T3) on hot day conditions (FIG. 3). The intercooling variable vanes 80 are closed for cruise to reduce the intercooling turbine expansion pressure ratio (ICT PR) and the intercooling effect (FIG. 4).

The second stream bypass flowpath 58 permits the match of the ICT 24 exit flow to the flow demand into the HPC 28. That is, the ICT 24 expands fan section 22 flow to reduce inlet temperatures to the HPC 28.

Figure 2:
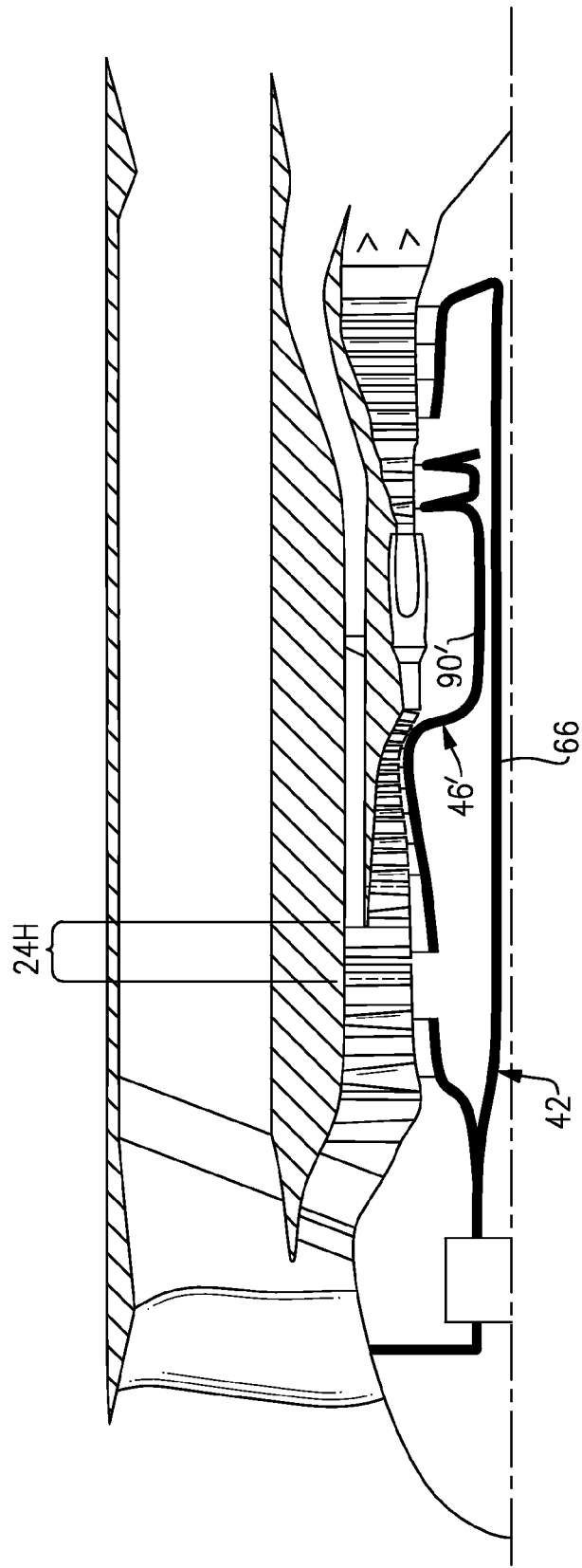
FIG. 2 is a general schematic view of an exemplary variable cycle gas turbine engine according to another non-limiting embodiment.

With reference to FIG. 2, in another disclosed, non-limiting embodiment, the ICT 24H is coupled to the high shaft 90' and is driven with the high spool 46'. When the ICT 24H is on the high spool 46', the ICT 24H operates relatively faster and the amount of turning in the turbine is relatively smaller as compared to the when the ICT 24 is on the low spool 42 (FIG. 1). The ICT 24H on the high spool 46' is more efficient thermodynamically but relatively less efficient aerodynamically. There are thereby some tradeoffs involved, but otherwise the architecture and operation is generally equivalent.

With reference to FIGS. 3 and 4, a conventional engine cycle is defined thermodynamically on an example Temperature-Entropy diagram by the points A, B, C, E, F, G, H. The priority for improvement of the thermodynamic efficiency of the engine is to increase the area enclosed by the points B, C, E, F, G, but especially doing so by "raising the roof" of points (E) and (F) that correspond respectively to an increase in the overall PR of the engine compression system (E) and an increase in the inlet temperature to the HPT 32 (F). It should be appreciated that the temperatures are merely exemplary to one disclosed non-limiting embodiment and should not be considered otherwise limiting.

The inventive engine cycle disclosed herein is defined thermodynamically on the Temperature-Entropy diagram by points a, b, c, d, e, f, g, h. The priority is improvement of the cruise condition efficiency where significant fuel is consumed.

Both the conventional engine and the inventive engine 20 architectures disclosed herein operate at the hot day takeoff condition (FIG. 3) with the same inlet temperature and pressure to the engine, the same inlet temperature and pressure to the low pressure compressor 44: TB=Tb; and PB=Pb, as well as the same temperature and pressure at the exit of the low pressure compressor 44: TC=Tc; and PC=Pc.

For the inventive engine disclosed herein the inlet temperature and pressure to the HPC 28 are Td and Pd, respectively. The ICT 24 expands the exit flow of the low pressure compressor 44 so that the inlet temperature and pressure to the HPC 28 of the inventive engine are decreased significantly to achieve an intercooling effect on the temperature of compression, that is, Td<TC and Pd<PC.

For both the conventional engine and the inventive engine, the exit condition of the HPC 28 is the inlet condition of the combustor section 30. Both the conventional engine and the inventive engine operate at the hot day takeoff condition with the same combustor inlet temperature (T3), where TE=Te, and with the same HPT 32 first rotor inlet temperature, (T4.1), where TF=Tf. This is consistent with utilization of the same materials and mechanical design technologies for both the conventional and inventive engine.

The pressure ratio (PR) of the HPC 28 of the inventive engine is significantly higher than the PR of the conventional engine, that is, Pe:Pd>PE:PC. The temperature ratio (TR) of the HPC 28 of the inventive engine is significantly higher than the TR of the conventional engine, that is, Te:Td>TE:TC. The higher PR of the HPC 28 of the inventive engine 20 is achievable, for example, with additional compressor section stages.

Neglecting combustor pressure losses, the pressures, PE and PF for the conventional engine are the same. The pressures, Pe and Pf, for the inventive engine are the same, but PE>Pe and PF>Pf; this is attributable to the pressure expansion in the ICT 24.

Both the conventional engine and the inventive engine operate with the same HPT 32 first rotor inlet temperature (T4.1), and TF=Tf at the hot day takeoff condition. At the hot day takeoff condition, both the conventional engine and the inventive engine operate with the same exit pressure from the turbine section so that PG=Pg, but not the same exit temperature from the turbine section, that is, Tg>TG.

The thermodynamic cycle efficiency of an engine generally is proportional to the ratio of two areas on the Temperature-Entropy diagram. That is, the numerator area and the denominator area form this ratio of areas. For the conventional engine, the numerator area is enclosed by the points B, C, E, F, and G, while the denominator area is enclosed by the points H, G, B, and A. For the inventive engine, the numerator area is enclosed by the points b, c, d, e, f, and g, while the denominator area is enclosed by the points h, g, b, and a.

At the hot day takeoff condition, the numerator area of the conventional engine is greater than or equal to the numerator area of the inventive engine, while the denominator area of the conventional engine is less than the denominator area of the inventive engine; thus, the thermodynamic efficiency of the conventional engine is relatively better than the inventive engine at the hot day takeoff condition (FIG. 3).

The priority, however, is to improve the thermodynamic cycle efficiency at the cruise condition where much of the fuel is consumed. Both the conventional engine and the inventive engine operate at the cruise condition with the same inlet temperature and pressure to the engine and the same inlet temperature and pressure to the low pressure compressor 44; TB=Tb and PB=Pb. Note that the inlet temperature and pressure at the cruise condition (FIG. 4) are less than the inlet temperature and pressure at the hot day takeoff condition (FIG. 3).

At the cruise condition, both the conventional and inventive engine have the same temperature and pressure at the exit of the low pressure compressor 44; TC=Tc and PC=Pc. For the inventive engine 20, the inlet temperature and pressure to the HPC 28 are Td and Pd, respectively. At the cruise condition, the ICT 24 expands the exit flow of the low pressure compressor 44 so that the inlet temperature and pressure to the HPC 28 of the inventive engine are not decreased significantly to obtain a smaller intercooling effect on the temperature within the compressor section; regardless, Td<TC and Pd<PC.

The expansion of the ICT 24 is selectively less at the cruise condition and this is obtained by modulation of the variable vanes 76 and 80. At the cruise condition as well as the hot day takeoff condition, the HPC 28 of the inventive engine 20 has a higher PR than the conventional engine and the higher PR is achieved for example, with additional stages of compression in the HPC 28. The pressure ratio (PR) of the HPC 28 of the inventive engine is significantly higher than the PR of the conventional engine, that is, Pe:Pd>PE:PC. The temperature ratio (TR) of the HPC of the inventive engine is significantly higher than the TR of the conventional engine, that is, Te:Td>TE:TC. At the cruise condition, the HPC 28 exit pressure and exit temperature of the inventive engine are higher than the conventional engine, that is, Pe>PE and Te>TE.

For both the conventional engine and the inventive engine, the exit condition of the HPC 28 is the inlet condition of the combustor section 30. Neglecting combustor pressure losses, the pressures, PE and PF for the conventional engine are the same. The pressures, Pe and Pf for the inventive engine are the same, but at the cruise condition, Pe>PE and Pf>PF; this is attributed to the deliberately smaller expansion of pressure in the ICT 24 and the higher PR of the HPC 28 of the inventive engine.

Application of the same materials and mechanical design technologies to both the conventional and inventive engine is limiting at the hot day takeoff condition but not at the cruise condition provided T3 and T4.1 at the cruise condition are lower than at the hot day takeoff condition.

At the cruise condition, HPT 32 first rotor inlet temperature (T4.1) of the inventive engine is greater than T4.1 of the conventional engine; that is, Tf>TF at the cruise condition. At the cruise condition, both the conventional engine and the inventive engine operate with the same exit pressure of the turbine section so that PG=Pg, and the same exit temperature from the turbine section, TG=Tg.

With reference to FIG. 4, at the cruise condition, the numerator area of the inventive engine is greater than the numerator area of the conventional engine, while the denominator areas of the conventional engine and the inventive engine are the same; thus, the thermodynamic efficiency of the inventive engine is greater than the conventional engine at the cruise condition. The larger numerator area of the inventive engine is evident by comparison between the two sectional areas of the Temperature-Entropy diagram at the cruise condition.

The first sectional area is enclosed by the points z, e, f, and F, while the second sectional area is enclosed by the points C, E, z, and d. The first sectional area yields an increase in the numerator area of the inventive engine while the second sectional area yields a reduction in the numerator area of the inventive engine. The first sectional area is greater than the second sectional area to yield a net increase in the numerator area of the inventive engine disclosed herein versus the numerator area of the conventional engine.

The ICT 24 effectively "raises the roof" of the thermodynamic cycle of the engine at the cruise condition with the same materials and mechanical design constraints as a conventional engine architecture at the hot day takeoff condition.

It should be understood that relative positional terms such as "forward," "aft," "upper," "lower," "above," "below," and the like are with reference to the engine but should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a combustor section;
   a low spool along an engine axis with a fan section and an intercooling turbine section forward of said combustor section, said fan section and said intercooling turbine section coaxial with said low spool;
   a high spool along said engine axis with a high pressure compressor section and a high pressure turbine section, said high pressure compressor section and said high pressure turbine section coaxial with said high spool, said high pressure compressor section aft of said intercooling turbine section and forward of said combustor section, said high pressure turbine section aft of said combustor section; and
   wherein said intercooling turbine section is configured to expand flow between said fan section and an inlet of said high pressure compressor section.

2. The gas turbine engine as recited in claim 1, wherein said fan section includes a bypass fan driven by said low spool through a geared architecture.

3. The gas turbine engine as recited in claim 1, wherein said inlet of said high pressure compressor section is immediately downstream of an exit of said intercooling turbine section.

4. The gas turbine engine as recited in claim 1, wherein said high pressure turbine section is upstream of a low pressure turbine section.

5. The gas turbine engine as recited in claim 4, wherein intercooling turbine section is configured to drive a low pressure compressor section through a low shaft, and said high pressure turbine section is configured to drive said high pressure compressor section through a high shaft.

6. The gas turbine engine as recited in claim 5, wherein said intercooling turbine section is configured to expand flow between an exit of said low pressure compressor section and said inlet of said high pressure compressor section.

7. The gas turbine engine as recited in claim 5, wherein said intercooling turbine section is configured to modulate flow in a duct such that an expansion pressure ratio across intercooling turbine section is reduced during a first flight condition, and is increased during a second flight condition.

8. The gas turbine engine as recited in claim 1, wherein said intercooling turbine section includes at least an intercooling turbine vane, and at least an intercooling turbine rotor.

9. The gas turbine engine as recited in claim 8, wherein said at least an intercooling turbine vane is a variable vane.

10. The gas turbine engine as recited in claim 1, wherein said intercooling turbine section includes an upstream intercooling turbine variable vane, an intercooling turbine rotor and a downstream intercooling turbine variable vane.

11. The gas turbine engine as recited in claim 10, wherein said intercooling turbine section is configured to selectively modulate flow from said fan section to said high pressure compressor section.

12. The gas turbine engine as recited in claim 10, wherein said downstream intercooling turbine variable vane is immediately upstream of a split between a second stream bypass flow path and a core flow path.

13. The gas turbine engine as recited in claim 12, wherein said combustor section is in communication with said core flow path.

14. The gas turbine engine as recited in claim 12, wherein said high pressure compressor section and said high pressure turbine section in communication with said core flow path.

15. The gas turbine engine as recited in claim 14, further comprising an inlet guide vane upstream of said high pressure compressor section and downstream of said intercooling turbine section, said inlet guide vane within said core flow path.

16. The gas turbine engine as recited in claim 1, wherein an inlet of said intercooling turbine section is downstream from said fan section and two stages of a low pressure compressor section, and an outlet of said intercooling turbine section is upstream from each stage of said high pressure compressor section.

17. A gas turbine engine comprising:
a combustor section;
a low spool along an engine axis with a fan section forward of said combustor section, said fan section coaxial with said low spool;
a high spool along said engine axis with an intercooling turbine section, a high pressure compressor section and a high pressure turbine section, said intercooling turbine section and said high pressure compressor section forward of said combustor section and said high pressure turbine section aft of said combustor section, said high pressure compressor and said high pressure turbine coaxial with said high spool, said intercooling turbine section coaxial with said high spool; and
wherein said intercooling turbine section is configured to expand flow between said fan section and an inlet of said high pressure compressor section.

18. The gas turbine engine as recited in claim 17, wherein said low spool includes a low pressure compressor section aft of said intercooling turbine section and forward of said combustor section.

19. The gas turbine engine as recited in claim 17, wherein said low spool includes a low pressure turbine section aft of said combustor section.

20. The gas turbine engine as recited in claim 17, wherein said fan section includes a bypass fan driven by said low spool through a geared architecture.

* * * * *